United States Patent
Kwak et al.

(10) Patent No.: US 10,873,667 B2
(45) Date of Patent: *Dec. 22, 2020

(54) CALL AND CONTACT SERVICE CENTER PARTIAL SERVICE AUTOMATION

(71) Applicant: salesforce.com, inc., San Francisco, CA (US)

(72) Inventors: Youngjun Kwak, San Fernando, CA (US); Alan Dawkuan Hwang, San Fernando, CA (US); Cody Henshaw, San Fernando, CA (US)

(73) Assignee: Salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,935

(22) Filed: Mar. 19, 2020

(65) Prior Publication Data

US 2020/0220978 A1    Jul. 9, 2020

Related U.S. Application Data

(63) Continuation of application No. 15/803,376, filed on Nov. 3, 2017, now Pat. No. 10,601,997.

(51) Int. Cl.
| | |
|---|---|
| *H04M 3/00* | (2006.01) |
| *H04M 3/60* | (2006.01) |
| *H04M 3/51* | (2006.01) |
| *G06F 40/00* | (2020.01) |
| *G06F 40/35* | (2020.01) |
| *G06F 40/56* | (2020.01) |

(52) U.S. Cl.
CPC .............. *H04M 3/60* (2013.01); *G06F 40/00* (2020.01); *G06F 40/35* (2020.01); *G06F 40/56* (2020.01); *H04M 3/5166* (2013.01); *H04M 3/5183* (2013.01)

(58) Field of Classification Search
CPC .. H04M 3/5175; H04M 3/523; H04M 3/5191; H04M 3/5183; H04M 3/5166; H04M 3/5232
USPC .......................... 379/265.01–265.02, 265.09
See application file for complete search history.

(56) References Cited

U.S. PATENT DOCUMENTS

| | | |
|---|---|---|
| 2007/0254669 A1 | 11/2007 | Katz |
| 2015/0063556 A1 | 3/2015 | Uba |
| 2017/0048170 A1 | 2/2017 | Smullen |
| 2017/0324866 A1 | 11/2017 | Segre |

*Primary Examiner* — Rasha S Al Aubaidi
(74) *Attorney, Agent, or Firm* — Butzel Long

(57) ABSTRACT

A method of semiautonomous processing of a conversation on a digital data device includes the steps of receiving, with the digital data device, a communication from a requesting agent, analyzing the communication to discern an intent, determining whether an intent-purposed bot is available for execution on or in connection with the first digital data device to process a said communication of said intent and, if so, upon approval of a responding agent, processing with the bot any of the communication, an interaction of which the communication forms a part, and session of which the interaction forms a part.

20 Claims, 2 Drawing Sheets

US 10,873,667 B2

CALL AND CONTACT SERVICE CENTER PARTIAL SERVICE AUTOMATION

BACKGROUND

Field of Technology

This pertains to call and contact service center automation and, more particularly, by way of example, to software-assisted call and contact handling.

Call and contact service centers (or "call centers") are centralized offices that support retailing, customer service, telemarketing and a host of other functions. They make up a large industry, with several hundreds of thousands (and, perhaps, millions) of centers worldwide, and with combined annual revenues in the hundreds of billions of dollars. Although they are traditionally referred to as "call" service centers, modern-day such centers handle electronic communications of all sorts, whether made by phone, email, text messaging, or otherwise. Call center agents face a number of challenges, including the need to handle high call volumes and repetitive tasks quickly, efficiently and accurately, all while keeping customer interactions professional and uplifting. This burden is shouldered equally by call center owners, who struggle to maintain suitably large and trained staffs in the face of above-average rates of employee turnover.

Despite the recent developments in call center automation, there remains room for improvement.

BRIEF DESCRIPTION OF THE DRAWINGS

A more complete understanding of the discussion that follows may be attained by reference to the drawings, in which.

DETAILED DESCRIPTION OF THE ILLUSTRATED EMBODIMENT

Figure 1:
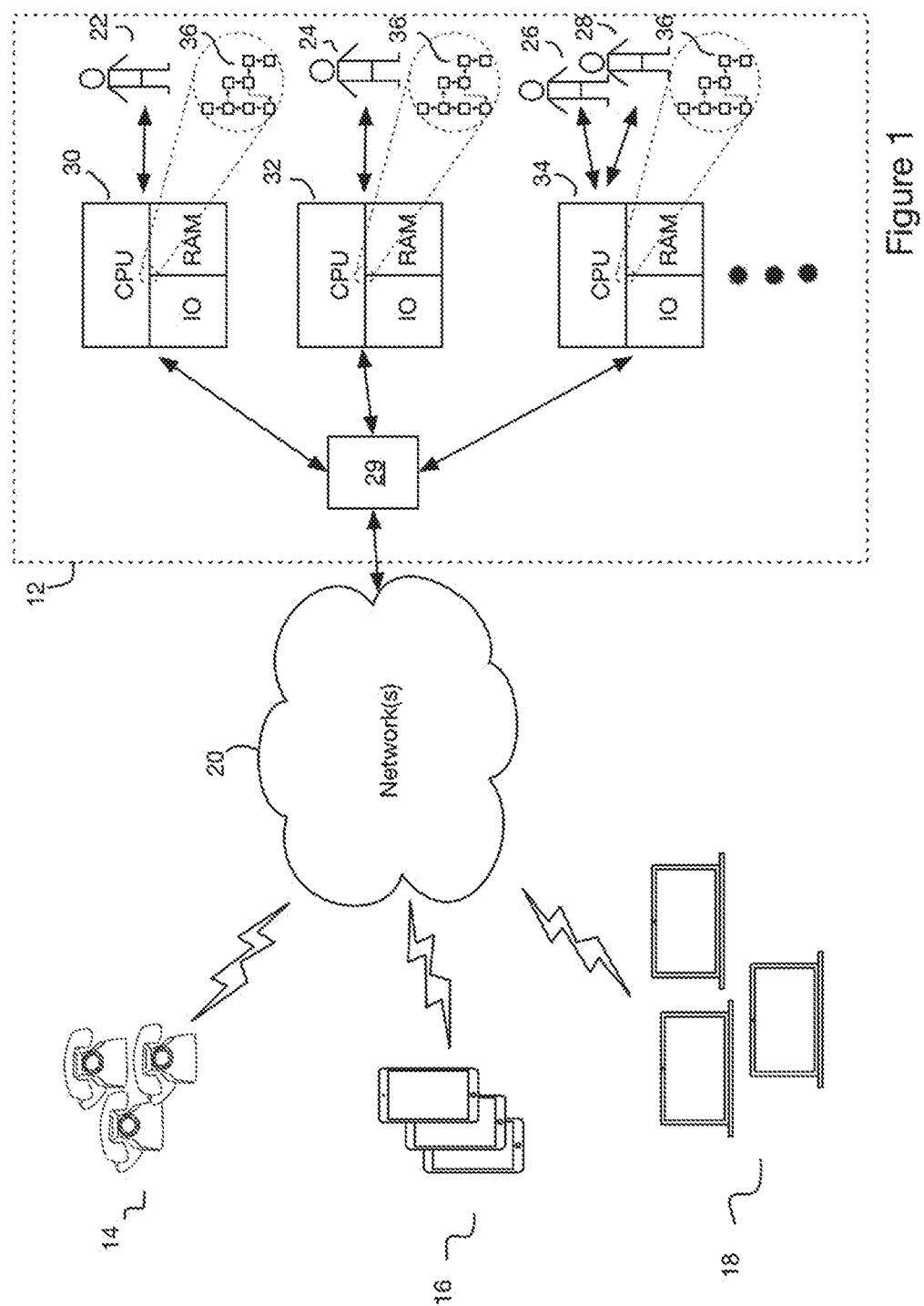
FIG. 1 depicts an illustrative embodiment and an environment in which it is employed.

FIG. 1 depicts an illustrative embodiment and an environment in which it is employed. As illustrated there, call and contact service center 12 receives requests and other communications from "requesting agents" (automated or otherwise) via their respective electronic devices 14-18 over network(s) 20. The communications, which are of the conventional type known in the art, may pertain to retailing, customer service, telemarketing, all by way of nonlimiting example. Such a communication may be, for example, a request (automated or otherwise) to order a product sold by a retailer, manufacturer or other client of center 12. The service center 12 supports the automated handling of electronic communications of one or more types, e.g., phone, email, text messaging, computer-to-computer data interchange protocols and/or otherwise; regardless, for convenience and without loss of generality, the center 12 is referred to below as a "call center," a "call processing center" or the like.

The requesting agents may be automated agents, e.g., robots, bots and/or other software and/or hardware functionalities of the type known in the art, as adapted in accord with the teachings hereof, operating on or in conjunction with their respective electronic devices 14-18 for purposes of issuing and responding to communications and otherwise engaging in automated interactions for designated purposes (e.g., product acquisition, information gathering or otherwise). The requesting agents may, instead or in addition, be humans (e.g., serving the role of customers, prospective customers or others) and, for sake of simplicity, are shown as such and referred to as "users" or the like without loss of generality in the drawings and in the text that follows. Although referred to herein as "requesting" agents, it will be appreciated that this is a label of convenience and that, in practice, so-called requesting agents may or may not issue requests and may, instead or in addition, issue responses, directives and other communications.

Devices 14-18 are of the conventional type known in the art, e.g., plain old telephone system (POTS) devices 14, mobile devices 16, computing devices 18, by way of non-limiting example, operating in the conventional manner known in the art, all as adapted in accord with the teachings hereof. To that end, devices 14-18 utilize web browsers, apps and/or other software, firmware and/or functionality (hardware or software) to support communications via network 20 between the respective users of those devices 14-18 and apparatus 30-34 of the call center 12.

Network(s) 20 comprises one or more public and/or private networks of the type known in the art operating in the conventional manner, all as adapted in accord with the teachings hereof, suitable for supporting communications between devices 14-18 and call handling apparatus of the call center 12. The network(s) 20 comprises, by way of nonlimiting example, one or more arrangements of the type known in the art, e.g., local area networks (LANs), wide area networks (WANs), metropolitan area networks (MANS), and or Internet(s).

The call service center 12 represents any such facility of the type known in the art that handles calls or or other electronic communications as discussed above. Typically (but not exclusively) such centers 12 field incoming requests, e.g., for orders, information, help or otherwise, and route those calls for handling by one or more "responding agents" (automated or otherwise). Such routing can be performed in the conventional manner known in the art (e.g., by one or more call routers, here, indicated by element 29) as adapted in accord with the teachings hereof.

The responding agents may be automated agents, e.g., robots, bots and/or other software and/or hardware functionalities of the type known in the art, as adapted in accord with the teachings hereof, operating on or in conjunction with their respective call handling apparatus 30-44 for purposes of processing and responding to communications and otherwise engaging in automated interactions with the requesting agents. The responding agents may, instead or in addition, be humans (e.g., serving the role of call service center agents or staff) and, for sake of simplicity, are shown as such and referred to as "agents," "staff" or the like without loss of generality in the drawings and in the text that follows. Although referred to herein as "responding" agents, it will be appreciated that this is a label of convenience and that, in practice, so-called responding agents may or may not issue responses and may, instead or in addition, issue requests, directives and other communications.

The apparatus 30-34 comprise digital data processors or other digital data devices suitable for semiautonomous processing of calls or other communications in accord with the teachings hereof. Thus, for example, apparatus 30-34 may comprise conventional desktop computers, workstations, minicomputers, laptop computers, tablet computers, PDAs, mobile phones or other digital data devices of the type that are commercially available in the marketplace, all as adapted in accord with the teachings hereof. And, by way of further non-limiting example, apparatus 30-34 that are used to process telephone calls can include voice-to-text functionality (not shown) of the type known in the art suitable for converting incoming communications to text or other digital form for suitable for processing in accord with the teachings hereof.

One or more of those devices 30-34 may be configured as and/or to provide a database system (including, for example, a multi-tenant database system) or other system or environment, and the devices 30-34 may be arranged to interrelate in a peer-to-peer fashion, per a client-server model, or otherwise, as adapted in accord with the teachings hereof. Apparatus 30-34 may be of the same type or a mix of differing types. As shown in the drawing, the apparatus 30-34 may be used by individual agents (as in the case, for example, of apparatus 30-32) or by multiple agents (as in the case, for example, of apparatus 34).

Each apparatus 30-34 comprises central processing, memory, and input/output subsections of the type known in the art suitable for executing software 36—indicated here by flowchart icons—of the type known in the art for call handling, as adapted in accord with the teachings hereof. That software includes, inter alia, an interface supporting communications between agents 22-28 and users of devices 14-18, e.g., via network 20, as well as functionality for semiautonomous call processing. That functionality is described below in connection with FIG. 2 and, though, it attributed to software 26 executing on apparatus 30-34, it will be appreciated that some or all of the functionality may be provided by other digital data processing apparatus, local or remote to the center 12, operating in connection with software 36.

As those skilled in the art will appreciate this and other software described herein comprise computer programs (i.e., sets of computer instructions) stored on transitory and non-transitory machine-readable media of the type known in the art as adapted in accord with the teachings hereof, which computer programs cause the respective call-handling apparatus 30-34 to perform the respective operations and functions attributed thereto herein. Such machine-readable media can include, by way of non-limiting example, hard drives, solid state drives, and so forth, coupled to the respective apparatus 30-34 in the conventional manner known in the art as adapted in accord with the teachings hereof.

Figure 2:
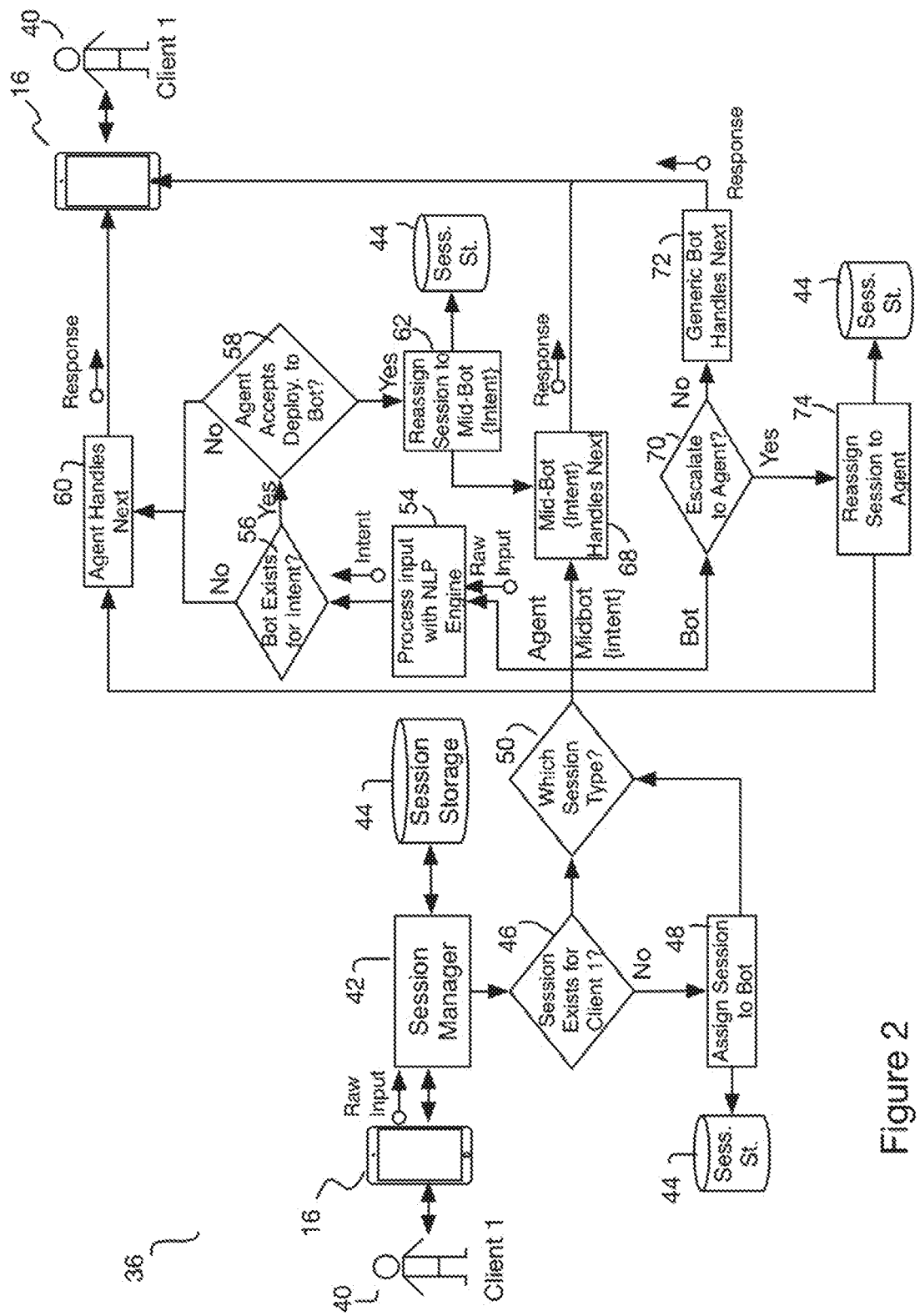
FIG. 2 depicts operation of an embodiment of the type shown in FIG. 1.

FIG. 2 depicts semiautonomous processing of a communication (which can be part of a new or existing conversation—or "session") from a user 40 of device 16 by software 36 executing on call handling apparatus 30 and/or in conjunction therewith. Software 36 operating on the other call handling apparatus 32-34 can operate similarly in response to communications received from that same or other devices 14, 18. Although reference is made above and elsewhere herein to communications "received" from device 16, that term and the semiautonomous call handling methodologies discussed herein apply equally to communications initiated from the call center 12, e.g., at behest of staff 22.

In step 42, a communication is received by a session manager 42 operating in conjunction with software 26. The communication can be an utterance, word, phrase, missive or other expression received by apparatus 30 directly from the user 40 or indirectly (e.g., through network 20, routing element 29, and so forth, all by way of example). The communication is represented, here, by the datum "raw input," which can be the original/live communication from user 40 (e.g., live voice data) or a copy thereof (e.g., a recording). This step is performed, e.g., by buffering and parsing the user communication, or by other techniques within the ken of those skilled in the art in view of the teachings hereof.

Through access to session store 44, which may be maintained local to apparatus 30 or otherwise, the session manager 42 determines whether the incoming communication pertains to an existing conversation/session between the user 40 and the call center agent (or agents) who are handling the call via apparatus 30. See, step 46. This can be part of an on-going telephone conversation, text message exchange, or the like. It can also be a prior conversation, exchange or otherwise, that was cut-off unexpectedly or otherwise. Step 46 can be performed, e.g., by comparing parameters of the call with those of other ongoing sessions reflected in store 44), or by other techniques within the ken of those skilled in the art in view of the teachings hereof.

If the incoming communication is not part of a existing conversation/session, it is (i) assigned to a general purpose automated call-handling "bot" for at least initiating processing of the call, and (ii) logged to the session store 44. See, step 48, which can be performed, e.g., by storing an appropriate data structure to session store 44, or by other techniques within the ken of those skilled in the art in view of the teachings hereof.

As used herein "bot" refers to artificial intelligence or other software of the type known in the art providing such functionality, as adapted in accord with the teachings hereof, executing in apparatus 30 and software 26 and/or in conjunction therewith.

In step 50, the session manager 42 initiates processing of the communication based on whether it has been assigned to a responding agent 22, a general purpose call-handling bot, or a special-purpose ("intent-purposed") mid-bot. Communications assigned to a human or other responding agent 22 are processed beginning in step 54; communication assigned to a mid-bot are processed beginning in step 68; communication assigned to a general purpose bot are processed beginning in step 70. Step 50 can be performed, e.g., by execution of a "case" statement, or by other techniques within the ken of those skilled in the art in view of the teachings hereof.

In step 54, communications assigned to a humans or other responding agent 22 are processed beginning with analyzing the raw input with a natural language processing engine or other suitable functionality known in the art to discern the intent of the communication and/or of the conversation of which it forms a part and/or of a multi-communication interaction forming part of that conversation. Step 54 and the engine on which it relies operate in the conventional manner known in the art, as adapted in accord with the teachings hereof. The engine can execute on apparatus 30 or, by way of nonlimiting example, on a remote server accessible by software 36.

In step 56, the software 36 discerns whether a bot is available for execution in or in connection with the software 36 (and/or the apparatus 30 in connection with which that software 36 executes) for processing a communication with the intent identified in step 54. If so, processing proceeds to step 58; if not, to step 60. Step 56 can be performed through searching of a library of bots, querying of an API, or by other techniques within the ken of those skilled in the art in view of the teachings hereof.

In step 60, the software 36 transfers control to human or other responding agent 22 for response to the communication from user 40 of the client device and processing in connection with that response. This can be by (i) notifying the agent of the incoming communication (by visual and/or audible prompt on computer monitors, loudspeakers or other peripherals coupled to apparatus 30), the status of session of which that communication is part (or that it is a new session, under appropriate circumstances), and the need for the agent to handle the incoming communication, and (ii) (re-)opening a communication channel for agent response to the user, or by other techniques within the ken of those skilled in the art in view of the teachings hereof. Following step 60, processing reverts to step 42 upon receipt of the next communication from device 16 on behalf of user 40.

Referring back to step 56, if software 36 discerns that a bot is available for processing a communication with the intent identified in step 54, it proceeds to step 58. There, the software 36 requests the agent 22 whether he she wishes to hand control over for machine-based response to the user communication. If the agent declines, control proceeds to step 60.

If the agent accepts, control proceeds to step 62, where the incoming communication is (i) assigned to a mid-bot suited to the intent discerned in step 54, and (ii) logged to the session store 44 as such. This can be performed, e.g., by storing an appropriate data structure to session store 44, or by other techniques within the ken of those skilled in the art in view of the teachings hereof.

In step 68, the software 36 hands control to mid-bot for the intent discerned in step 54 for response to the incoming communication from user 40 and/or order-handling, information-retrieval or other processing in connection with that response. This can be by (i) notifying the mid-bot of the incoming communication (through an API or otherwise), the status of session of which that communication is part, and any requisite parameters governing the mid-bat's response to the communication, and (ii) (re-)opening a communication channel for mid-bot response to the user, or by other techniques within the ken of those skilled in the art in view of the teachings hereof.

In some embodiments, the software 36 and/or the mid-bot allows the human or other responding agent to monitor the interaction between the mid-bot and the user 40, e.g., by presentation of same on the computer monitor and loudspeakers of apparatus 30). In such embodiments, the agent can intervene in that interaction by entering a keyboard escape sequence or otherwise. The software 36 can respond by reassigning the session to the agent (and recording that in store 44) and by passing control of the conversation to the agent per step 60. Likewise, once the mid-bot has finished processing a sequence of communications received by apparatus from the user 40 pursuant to the intent (e.g., a series of missives pertaining to ordering a product), the software 36 can revert control to the user by reassigning the session to the agent (and recording that in store 44) so that, upon receipt of the next communication, control is with the agent.

Following step 68, processing reverts to step 42 upon receipt of the next communication from device 16 on behalf of user 40.

As shown in FIG. 2 and mentioned above, processing also proceeds to step 68 if, in step 50, the session manager 42 determines that the communication has been assigned to a special-purpose mid-bot based on intent.

Communications assigned to a general purpose bot are processed beginning at step 70. There, software 36 (*i*) notifies the general purpose bot of the incoming communication (through an API or otherwise), the status of session of which that communication is part, and any requisite parameters governing the bat's response to the communication, and (ii) (re-)opens a communication channel for bot response to the user.

Before responding, the general purpose bot determines whether the communication and/or the interaction of which it forms a part requires escalation to a human (or other) responding agent 22. It can make that determination upon discerning that the user 40 has requested such elevation (as evident, e.g., in the incoming communication), that the bot does not understand the communication, that the bot is not equipped to handle a request or directive made in the communication, or for other reasons within the ken of those skilled in the art.

Upon making that determination, the bot signals software 36 (e.g., through a function value return or otherwise) and processing proceeds to step 74, where the incoming communication is (i) assigned for handling by the agent, and (ii) logged to the session store 44 as such. This can be performed, e.g., by storing an appropriate data structure to session store 44, or by other techniques within the ken of those skilled in the art in view of the teachings hereof. Following step 74, processing proceeds to step 60 as illustrated in the drawing.

If the bot does not determine that escalation is necessary, processing proceeds to step 72, whence the bot generates a response to the user 40. Following step 72, processing reverts to step 42 upon receipt of the next communication from device 16 on behalf of user 40. In some embodiments, the software 36 and/or the bot allows the human or other responding agent 22 to monitor the interaction between the bot and the user 40, e.g., by presentation of same on the computer monitor and loudspeakers of apparatus 30). In such embodiments, the agent can intervene in that interaction, if necessary, e.g., by entering a keyboard escape sequence or otherwise. In response, the software 36 reassigns the session to the agent (and record that in store 44) and passes control to the agent per step 60.

By way of example, in operation of a service center 12 utilizing the method of FIG. 2, a communication (e.g., an utterance, word, phrase, missive or other user expression that is part of a new or on-going call) received by the center 12 from a requesting agent (e.g., user) 40 via device 16 (and network 20) and routed to call-handling apparatus, e.g., 30, is checked to see if it pertains to an existing session and, thereby, is currently assigned for handling by a human or other responding agent, a general artificial intelligence bot, or a special-purpose such bot for a specific intent. If it does not pertain to such a session, the call is assigned for handling by a general purpose bot. See, step 48.

Communications assigned for handling by the human or other responding agent are processed by a natural language processing or other engine to discern intent. See, step 56. If a special-purpose bot is available for handling such an intent and if the human or other responding agent approves, that bot is given control for responding to the user 40 and/or handling other processing in connection therewith. See, step 68. This avoids the need for the human or other responding agent, for example, to handle repetitive tasks which can be processed by the mid-bot instead. That way, the agent can be more efficient and potentially even handle multiple cases at once.

For example, when the software 36 detects that the user 40 is requesting that a repetitive and simple task (e.g. "I want to purchase this"—which would require the agent to verify the payment method, shipping address, billing address, etc.), the software 36 alerts the agent that a bot can be deployed to handle that specific interaction. If the agent agrees to deploy the bot, the bot will handle the task, and the service agent is able to monitor the interaction between the customer and the bot. Once the bot has finished handling the task, it signals to the agent that the automated interaction has ended. Then the agent can then resume helping the user. If no such bot is available and/or the agent does not approve the use of such, control is handed to the agent to respond with handling processing in connection therewith. See, step 60.

Communications assigned for handling by a general purpose bot are handed over to it for reply and processing (step 74), unless the bot determines to escalate handling to the human or other responding agent (step 70), in which case control is handed over to the agent for response and processing (step 60).

The embodiments above are merely illustrative examples. Other embodiments are contemplated, as well. For example, although described in connection with processing of an incoming communication by a call-handling apparatus 30 of a call center 12, it will be appreciated that methodology of FIG. 2 can be utilized in connection with the semiautonomous processing of communications in other contexts and for other purposes. By way of non-limiting example, that methodology can be employed on user devices 14-18 for semiautonomous processing of communications received from online services, other users and so forth.

The invention claimed is:

1. A computer-implemented method comprising:
   receiving, at a computing device, a communication from a client device;
   determining, by the computing device, an intent of the communication;
   determining, by the computing device, that a special-purpose artificial intelligence bot for processing the communication is available on the computing device based on the determined intent of the communication;
   sending, by the computing device to a device of a responding agent, a request for approval from the responding agent to use the special-purpose artificial intelligence bot to process the communication;
   receiving, on the computing device, from the device of the responding agent, approval from the responding agent to use the special-purpose artificial intelligence bot to process the communication;
   generating, by the computing device in response to the approval from the responding agent, with the special-purpose artificial intelligence bot, a response to the communication; and
   providing, by the computing device, the response to the client device.

2. The method of claim 1, wherein determining, by the computing device, an intent of the communication comprises analyzing, by the computing device, the communication with a natural language processing engine.

3. The method of claim 1, further comprising performing, by the computing device, with the special purpose artificial intelligence bot, information retrieval based on the determined intent of the communication, and wherein the response comprises results of the information retrieval.

4. The method of claim 1, further comprising performing, by the computing device, with the special purpose artificial intelligence bot, order-handling based on the determined intent of the communication, and wherein the response comprises a response to a request to order a product.

5. The method of claim 1, further comprising storing, by the computing device in a session storage, a session for the communication comprising an indication that the communication was assigned to the special-purpose artificial intelligence bot.

6. The method of claim 5, further comprising:
   receiving, at the computing device, a second communication from the client device;
   determining, by the computing device, that the second communication is associated with the session for the communication in the session storage;
   generating, by the computing device, with the special-purpose artificial intelligence bot, a response to the second communication; and
   providing, by the computing device, the response to the second communication to the client device.

7. The method of claim 1, further comprising:
   monitoring, by the responding agent of the computing device, the special-purpose artificial intelligence bot;
   receiving, on the computing device, a request from the responding agent to assign a session for the communication to the responding agent;
   assigning, by the computing device, the session for the communication to the responding agent; and
   storing, by the computing device in a session storage, the session for the communication comprising an indication that the communication was assigned to the responding agent.

8. The method of claim 1, further comprising:
   determining that the special-purpose artificial intelligence bot has finished processing a sequence of communications for the determined intent from the client device;
   assigning, by the computing device, the session for the communication to the responding agent; and
   storing, by the computing device in a session storage, the session for the communication comprising an indication that the communication was assigned to the responding agent.

9. The method of claim 1, wherein the special-purpose artificial intelligence bot is one of a plurality of special-purpose artificial intelligence bots,
   and wherein determining, by the computing device, that a special-purpose artificial intelligence bot for processing the communication is available on the computing device based on the determined intent of the communication comprises:
   determining, by the computing device, that one or more of the plurality of special-purpose artificial intelligence bots are not available for processing the communication based on the determined intent of the communication.

10. The method of claim 1, wherein the responding agent is unaware that the special-purpose artificial intelligence bot is available for processing the communication before the computing device determines that the special-purpose artificial intelligence bot is available for processing the communication.

11. A system comprising:
   a computing device that receives a communication from a client device,
   determines an intent of the communication,
   determines that a special-purpose artificial intelligence bot for processing the communication is available on the computing device based on the determined intent of the communication,
   sends, to a device of a responding agent, a request for approval from the responding agent to use the special-purpose artificial intelligence bot to process the communication
   receives, from the device of the responding agent, approval from a responding agent to use the special-purpose artificial intelligence bot to process the communication, generates, in response to the approval from the responding agent, with the special-purpose artificial intelligence bot, a response to the communication, and provides the response to the client device.

12. The system of claim 11, wherein the computing device determines an intent of the communication comprises analyzing the communication with a natural language processing engine.

13. The system of claim 11 further wherein the computing device further performs, with the special purpose artificial intelligence bot, information retrieval based on the determined intent of the communication, and wherein the response comprises results of the information retrieval.

14. The system of claim 11, wherein the computing device performs, with the special purpose artificial intelligence bot, order-handling based on the determined intent of the communication, and wherein the response comprises a response to a request to order a product.

15. The system of claim 11, further comprising a storage device comprising a session storage, and wherein the computing device further stores, in the session storage of the storage device, a session for the communication comprising an indication that the communication was assigned to the special-purpose artificial intelligence bot.

16. The system of claim 15, wherein the computing device further receives a second communication from the client device,
 determines that the second communication is associated with the session for the communication in the session storage,
 generates, with the special-purpose artificial intelligence bot, a response to the second communication, and
 provides the response to the second communication to the client device.

17. The system of claim 11, further comprising a storage device comprising a session storage, and wherein the computing device further monitors, with the responding agent, the special-purpose artificial intelligence bot,
 receives a request from the responding agent to assign a session for the communication to the responding agent,
 assigns the session for the communication to the responding agent, and
 stores, in the session storage, the session for the communication comprising an indication that the communication was assigned to the responding agent.

18. The system of claim 11, further comprising a storage device comprising a session storage, and wherein the computing device further determines that the special-purpose artificial intelligence bot has finished processing a sequence of communications for the determined intent from the client device,
 assigns the session for the communication to the responding agent, and
 stores the computing device in the session storage, the session for the communication comprising an indication that the communication was assigned to the responding agent.

19. The system of claim 11, wherein the special-purpose artificial intelligence bot is one of a plurality of special-purpose artificial intelligence bots,
 and wherein the computing device determines that a special-purpose artificial intelligence bot for processing the communication is available on the computing device based on the determined intent of the communication by determining that one or more of the plurality of special-purpose artificial intelligence bots are not available for processing the communication based on the determined intent of the communication.

20. The system of claim 11, wherein the responding agent is unaware that the special-purpose artificial intelligence bot is available for processing the communication before the computing device determines that the special-purpose artificial intelligence bot is available for processing the communication.

* * * * *